United States Patent Office 2,846,435
Patented Aug. 5, 1958

2,846,435

6-ETHER SUBSTITUTED 1,2,3,4-TETRAHYDRO-ALKYLQUINOLINES

James O. Harris, St. Albans, W. Va., assignor to Monsanto Chemical Company, St. Louis, Mo., a corporation of Delaware No Drawing. Application July 27, 1953
Serial No. 370,615

5 Claims. (Cl. 260—289)

This invention relates to new and useful compositions of matter. More particularly it relates to 6-ether substituted 1,2,3,4-tetrahydroalkylquinolines.

One of the major problems of the rubber industry is the protection of rubber (natural and synthetic) goods against exposure cracking, that is degradation due to ozone while the rubber article is under either static or dynamic stress. The problem is a difficult one and is aggravated by the fact that in general chemical antioxidants or age-retarders have little or no value in protecting against deterioration by ozone. Although many materials have been suggested, such as the various waxes, factice, cellulose and the like to prevent ozone from reaching the rubber surface, not one has been found entirely satisfactory. Accordingly rubber technologists have constantly sought improvements.

In accordance with this invention it has been found that 6-ether substituted 1,2,3,4-tetrahydroalkylquinolines of the general formula

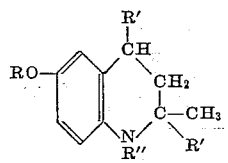

where R is a hydrocarbon radical such as methyl, ethyl, propyl, isopropyl, butyl, amyl, octyl, dodecyl, benzyl, phenethyl, hexahydrobenzyl, cyclohexyl, phenyl, tolyl, p-tert-butyl phenyl, naphthyl, and the like and where R' and R'' are the same or different short chain alkyl radicals such as methyl, ethyl, propyl, butyl, etc., or R'' is hydrogen are a new family of valuable compounds. The new compounds are particularly effective anti-exposure cracking agents for natural and synthetic rubber goods. Of the new compounds 6-ether substituted 2,2,4-trialkyl-1,2,3,4-tetrahydroquinolines wherein the 2,2,4-substituents are methyl radicals and the ether group is an alkoxy radical containing from 1 to 4 carbon atoms are particularly effective in the control of exposure cracking and represent a preferred embodiment of this invention.

The new anti-exposure cracking agents provided by this invention are the products of the hydrogenation of the corresponding 6-ether substituted 2,2,4-trialkyl-1,2-dihydroquinoline with an equimolecular amount of hydrogen in the presence of an effective hydrogenation catalyst, such as platinum, palladium or finely divided nickel. The hydrogenation may be conducted in the presence or absence of a saturated solvent incapable of being hydrogenated. Examples of operable solvents are cyclohexane and lower aliphatic acids. The reaction is usually carried out at temperatures between room temperature and 200° C. and hydrogen pressures of from 300 to 700 pounds per square inch gauge pressure, however it may be accomplished at lower or higher temperatures and pressures. The extent of the hydrogenation may be readily followed by observing the decrease in pressure as hydrogen is consumed. The hydrogenation reaction is preferably continued until hydrogen has been consumed in an amount corresponding approximately to that theoretically required for conversion of the 1,2-dihydroquinoline to the 1,2,3,4-tetrahydroquinoline.

The 6-ether substituted 2,2,4-trialkyl-1,2-dihydroquinoline reactants employed in preparing the new compounds of this invention are obtained by condensing a para-ether substituted aniline

with a methyl ketone

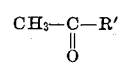

in a molar ratio of at least 1:2 in the presence of a suitable catalyst, e. g. iodine or bromine. It is now generally accepted that the condensation products of such primary amines with such methyl ketones are 1,2-dihydroquinolines of the structure

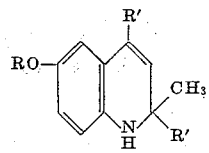

R and R' having the same significance as aforedescribed.

As illustrative of the preparation of the new compounds of this invention are the following:

EXAMPLE 1

In a pressure autoclave 35.0 parts by weight (substantially 0.16 mole) of 6-ethoxy-2,2,4-trimethyl-1,2-dihydroquinoline (B. P. 123–125° C./2 mm.) was dissolved in 120 parts by weight of methanol and 7 parts by weight of a 60% by weight suspension of finely divided nickel in mineral oil was incorporated therein as the catalyst. While constantly agitating at room temperature and maintaining a pressure in the range of 450–635 pounds per square inch, hydrogen was admitted to the mix over a period of about 45 minutes. The temperature rose gradually to about 125° C. Thereupon the reaction mix was removed and filtered and the solvent removed by evaporation. 35.3 parts by weight of a light yellow liquid possessing a boiling point of 122° C./2 mm., believed to be 6-ethoxy-2,2,4-trimethyl-1,2,3,4-tetrahydroquinoline, was obtained.

EXAMPLE 2

Into a reactor of suitable capacity was charged 66 parts by weight (0.3 molecular proportion) of 6-ethoxy-2,2,4-trimethyl-1,2,3,4-tetrahydroquinoline, 42.6 parts by weight (0.3 molecular proportion) of methyl iodide, 35.4 parts by weight of sodium carbonate and 354 parts by weight of water. The mixture was heated to refluxing temperature for about 6 hours and the organic layer separated. There was also formed a small amount of a solid by-product insoluble in both benzene and water. This was probably the quaternary salt. The benzene soluble portion of the organic layer was distilled under reduced pressure. 58.5 parts by weight of 6-ethoxy-1,2,2,4-tetramethyl-1,2,3,4-tetrahydroquinoline was obtained, B. P. 144–153° C./2 mm., $n_D^{25}=1.5418$.

The following examples in tabular form are presented to illustrate the variety of new 1,2,3,4-tetrahydroquinolines which are prepared in accordance with the invention.

*Products of the reaction of hydrogen with a 6-ether substituted 2,2,4-trialkyl-1,2-dihydroquinoline*

| Dihydroquinoline | Product |
|---|---|
| 6-methoxy-2,2,4-trimethyl-1,2-dihydroquinoline. | 6-methoxy-2,2,4-trimethyl-1,2,3,4-tetrahydroquinoline. |
| 6-isopropoxy-2,2,4-trimethyl-1,2-dihydroquinoline. | 6-isopropoxy-2,2,4-trimethyl-1,2,3,4-tetrahydroquinoline. |
| 6-n-propoxy-2,2,4-trimethyl-1,2-dihydroquinoline. | 6-n-propoxy-2,2,4-trimethyl-1,2,3,4-tetrahydroquinoline. |
| 6-n-butoxy-2,2,4-trimethyl-1,2-dihydroquinoline. | 6-n-butoxy-2,2,4-trimethyl-1,2,3,4-tetrahydroquinoline. |
| 6-n-hexoxy-2,2,4-trimethyl-1,2-dihydroquinoline. | 6-n-hexoxy-2,2,4-trimethyl-1,2,3,4-tetrahydroquinoline. |
| 6-benzoxy-2,2,4-trimethyl-1,2-dihydroquinoline. | 6-benzoxy-2,2,4-trimethyl-1,2,3,4-tetrahydroquinoline. |
| 6-naphthoxy-2,2,4-trimethyl-1,2-dihydroquinoline. | 6-naphthoxy-2,2,4-trimethyl-1,2,3,4-tetrahydroquinoline. |
| 6-benzyloxy-2,2,4-trimethyl-1,2-dihydroquinoline. | 6-benzyloxy-2,2,4-trimethyl-1,2,3,4-tetrahydroquinoline. |
| 6-methoxy-2,4-diethyl-2-methyl-1,2-dihydroquinoline. | 6-methoxy-2,4-diethyl-2-methyl-1,2,3,4-tetrahydroquinoline. |
| 6-ethoxy-2,4-diethyl-2-methyl-1,2-dihydroquinoline. | 6-ethoxy-2,4-diethyl-2-methyl-1,2,3,4-tetrahydroquinoline. |
| 6-ethoxy-2,4-di-n-propyl-2-methyl-1,2-dihydroquinoline. | 6-ethoxy-2,4-di-n-propyl-2-methyl-1,2,3,4-tetrahydroquinoline. |
| 6-ethoxy-2,4-di-isopropyl-2-methyl-1,2-dihydroquinoline. | 6-ethoxy-2,4-di-isopropyl-2-methyl-1,2,3,4-tetrahydroquinoline. |
| 6-ethoxy-2,4-di-n-butyl-2-methyl-1,2-dihydroquinoline. | 6-ethoxy-2,4-di-n-butyl-2-methyl-1,2,3,4-tetrahydroquinoline. |
| 6-allyloxy-2,2,4-trimethyl-1,2-dihydroquinoline. | 6-allyloxy-2,2,4-trimethyl-1,2,3,4-tetrahydroquinoline. |
| 6-amoxy-2,2,4-trimethyl-1,2-dihydroquinoline. | 6-amoxy-2,2,4-trimethyl-1,2,3,4-tetrahydroquinoline. |
| 6-dodecyloxy-2,2,4-trimethyl-1,2-dihydroquinoline. | 6-dodecyloxy-2,2,4-trimethyl-1,2,3,4-tetrahydroquinoline. |

The anti-exposure cracking properties of the 6-alkoxy 2,2,4-trimethyl-1,2,3,4-tetrahydroquinolines are very similar regardless of the size of the alkoxy group, at least for the range of 1–12 carbon atoms. Furthermore, the replacement of the hydrogen on the nitrogen atom by a short chain alkyl group in the above identified products still retains the antiexposure cracking properties characteristic of the class although the tetraalkyl derivatives are somewhat inferior to the trialkyl derivatives.

As illustrative of the anti-exposure cracking properties in natural rubber vulcanizates of the new compounds of this invention, rubber compositions were prepared utilizing the following ingredients:

| Stock | A | B | C | D | E |
|---|---|---|---|---|---|
| | Parts by weight | | | | |
| Smoked sheets rubber | 100 | 100 | 100 | 100 | 100 |
| Carbon black | 50 | 50 | 50 | 50 | 50 |
| Saturated hydrocarbon softener | 3 | 3 | 3 | 3 | 3 |
| Zinc oxide | 5 | 5 | 5 | 5 | 5 |
| Stearic acid | 3 | 3 | 3 | 3 | 3 |
| Sulfur | 2.5 | 2.5 | 2.5 | 2.5 | 2.5 |
| N-Cyclohexyl-2-benzothiazole sulfenamide | 0.8 | 0.8 | 0.8 | 0.8 | 0.8 |
| 6-Ethoxy-2,2,4-trimethyl-1,2-dihydroquinoline [1] | | 1.5 | | 3.0 | |
| 6-Ethoxy-2,2,4-trimethyl-1,2,3,4-tetrahydroquinoline | | | 1.5 | | 3.0 |

[1] 6-ethoxy-2,2,4-trimethyl-1,2-dihydroquinoline is a well-known anti-exposure cracking agent.

The ingredients were admixed on a rubber mill in the customary fashion and the respective compounded stocks cured in a press at 142° C. for 30 minutes. Since evaluation under static conditions is not indicative of the service obtained with many types of rubber articles which must withstand flexing, the vulcanized compositions were evaluated under dynamic conditions in an atmosphere containing a definite concentration of ozone. Samples of the stocks were cured in the form of a belt ½" wide, ¼" thick and 5 5/16" diameter and mounted on 1" diameter shafts. The ozone concentration was maintained at 20–30 parts per hundred million throughout the test and the shafts were rotated at 75 R. P. M. In this manner a momentary elongation through a range of 0–20% was provided at any portion of the test specimen passing over the shaft. (The apparatus and procedure employed is described in a paper of Creed et al. entitled "An Apparatus for the Evaluation of Ozone Protective Agents for Elastomers under Dynamic Conditions" given at the Cincinnati, Ohio, Meeting of the Rubber Division of the American Chemical Society, May 1, 1952.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

TABLE I

| Stock | Surface Cracking after Flexing in Ozone for— | | | |
|---|---|---|---|---|
| | 8 hrs. | 32 hrs. | 48 hrs. | 96 hrs. |
| A | slight | extremely severe. | extremely severe. | |
| B | none | very slight | slight | |
| C | do | none | very slight | |
| D | do | do | none | moderate. |
| E | do | do | do | slight. |

The new compounds of this invention are particularly useful in the control of exposure cracking of the sulfur-vulcanizable synthetic rubber-like materials prepared by the polymerization of a conjugated diene compound, either alone or with other unsaturated compounds copolymerizable therewith. The synthetic rubbers which may be substantially improved in ozone resistance are polymers of aliphatic conjugated dienes such as butadiene, isoprene, ethyl butadiene, piperylene, dimethyl butadiene, and the like either alone or with unsaturated monoolefinic compounds which contain the $CH_2=C<$ group such as the vinyl aromatics, namely styrene, α-methyl styrene, nuclear substituted styrenes, monochlorstyrene, dichlorstyrene, divinyl benzene, vinyl naphthalene, vinyl biphenyl, vinyl carbazole, 2-vinyl-5-ethyl pyridine, etc., and such vinyl compounds as acrylonitrile, methacrylonitrile, acrylic acid, methacrylic acid, methyl vinyl ketone, and the like.

As illustrative of the control of exposure cracking of vulcanized sulfur-vulcanizable synthetic rubber-like materials, a rubbery butadiene-1,3-styrene copolymer composition was prepared utilizing the following ingredients:

| Stock | F | G | H | J |
|---|---|---|---|---|
| | Parts by weight | | | |
| GR-S 100 | 100 | 100 | 100 | 100 |
| Carbon black | 50 | 50 | 50 | 50 |
| Saturated hydrocarbon softener | 10 | 10 | 10 | 10 |
| Zinc oxide | 4 | 4 | 4 | 4 |
| Stearic acid | 2 | 2 | 2 | 2 |
| Sulfur | 1.75 | 1.75 | 1.75 | 1.75 |
| N-Cyclohexyl-2-benzothiazole sulfenamide | 1.2 | 1.2 | 1.2 | 1.2 |
| 6-Ethoxy-2,2,4-trimethyl-1,2-dihydroquinoline [1] | | 1.5 | | |
| 6-Ethoxy-2,2,4-trimethyl-1,2,3,4-tetrahydroquinoline | | | 1.5 | |
| 6-Ethoxy-1,2,2,4-tetramethyl-1,2,3,4-tetrahydroquinoline | | | | 1.5 |

[1] 6-ethoxy-2,2,4-trimethyl-1,2-dihydroquinoline is a well-known anti-exposure cracking agent.

The ingredients were admixed on a rubber mill in the customary fashion and the respective compounded stocks cured in a press at 144° C. for 30 minutes. The vulcanizates were then evaluated for cracking resistance as aforedescribed. The results of the tests are set forth below:

TABLE II

| Stock | Surface Cracking after Flexing in Ozone for— | | |
|---|---|---|---|
| | 8 hrs. | 32 hrs. | 56 hrs. |
| F | none | extremely severe | extremely severe. |
| G | do | very slight | moderate. |
| H | do | none | very slight. |
| J | do | do | slight. |

While the invention has been described with respect to certain specific embodiments it is not so limited and it is to be understood the variations and modifications thereof obvious to those skilled in the art may be made without departing from the spirit or scope of this invention.

This application is a continuation-in-part of application Serial No. 308,913, filed September 10, 1952.

What is claimed is:

1. As new compounds 6-ether substituted 1,2,3,4-tetrahydroquinolines of the structure

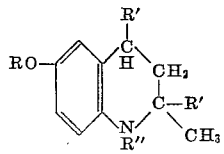

where R is a hydrocarbon radical containing less than 13 carbon atoms and R' is an alkyl group containing less than 5 carbon atoms and R" is selected from a group consisting of alkyl groups containing less than 5 carbon atoms and hydrogen.

2. As new compounds 6-ether substituted 2,2,4-trialkyl-1,2,3,4-tetrahydroquinolines of the structure

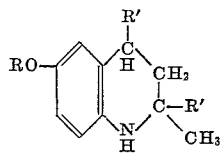

where R is a hydrocarbon radical containing less than 13 carbon atoms and where R' is an alkyl group containing less than 5 carbon atoms.

3. As new compounds 6-alkoxy substituted 2,2,4-trimethyl-1,2,3,4-tetrahydroquinolines.

4. As new compounds 6-alkoxy substituted 2,2,4-trimethyl-1,2,3,4-tetrahydroquinolines, the alkyl group of the alkoxy substituent containing from 1 to 4 carbon atoms inclusive.

5. As a new compound 6-ethoxy 1,2,2,4-tetramethyl-1,2,3,4-tetrahydroquinoline.

References Cited in the file of this patent

UNITED STATES PATENTS

| 2,203,899 | Dunbrook et al. | June 11, 1940 |
| 2,566,132 | Leffler et al. | Aug. 28, 1951 |

OTHER REFERENCES

Tomita et al.: J. Pharm. Soc., Japan, vol. 71, pp. 1198–1203 (1951) as abstracted in Chem Abstr., vol. 46, cols. 7618–7619 (1952).